(12) United States Patent
Navarro et al.

(10) Patent No.: US 8,201,018 B2
(45) Date of Patent: Jun. 12, 2012

(54) CONTROL OF SPARING IN STORAGE SYSTEMS

(75) Inventors: Guillermo Navarro, Boise, ID (US);
Milos Manic, Idaho Falls, ID (US);
David K. Umberger, Boise, ID (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 383 days.

(21) Appl. No.: 11/857,335

(22) Filed: Sep. 18, 2007

(65) Prior Publication Data

US 2009/0077418 A1 Mar. 19, 2009

(51) Int. Cl.
*G06F 11/00* (2006.01)
(52) U.S. Cl. ............ 714/6.22; 714/16; 714/54; 708/103
(58) Field of Classification Search .................... 714/16, 714/54; 708/103
See application file for complete search history.

(56) References Cited

U.S. PATENT DOCUMENTS

| | | | | |
|---|---|---|---|---|
| 5,278,838 A | * | 1/1994 | Ng et al. | 714/6 |
| 5,313,626 A | * | 5/1994 | Jones et al. | 714/5.11 |
| 5,680,539 A | * | 10/1997 | Jones | 714/6 |
| 5,758,076 A | * | 5/1998 | Wu et al. | 709/231 |
| 6,647,514 B1 | * | 11/2003 | Umberger et al. | 714/42 |
| 2002/0091746 A1 | * | 7/2002 | Umberger et al. | 709/105 |
| 2002/0184171 A1 | * | 12/2002 | McClanahan | 706/20 |
| 2004/0255206 A1 | * | 12/2004 | Sato et al. | 714/54 |
| 2005/0025004 A1 | * | 2/2005 | Park | 369/47.14 |
| 2006/0174157 A1 | * | 8/2006 | Barrall et al. | 714/6 |
| 2006/0251289 A1 | * | 11/2006 | Williams | 382/100 |
| 2007/0266037 A1 | * | 11/2007 | Terry et al. | 707/100 |

FOREIGN PATENT DOCUMENTS

JP 06011366 A * 1/1994

OTHER PUBLICATIONS

Muppalaneni, "Adaptive Hierarchical RAID", Jan. 1998, Indian Institute of Science, p. 1-82.*
Thomasian, "RAID Performance with Distributed Sparing", Jun. 1997, IEEE, vol. 8 No. 6, p. 1-18.*
Hou, "Comparing Rebuild Algorithms for mirrored and RAID5 Disk Arrays" 1993, ACM, p. 317-326.*
Min-Young, "Double Parity SParing for Performance Improvement in Disk Arrays", 1996, IEEE, p. 169-174.*
Thomasian, "Comment on 'RAID5 Performance with Distributed Sparing", Apr. 2006, IEEE, vol. 17 No. 4, p. 399-400.*
Holland, "Parity Declustering for Continuous Operation in Redundant Disk Arrays", 1992, Carnegie Mellon University, p. 1-13.*
Menon, "Comparison of Sparing Alternatives for Disk Arrays", 1992, ACM, p. 318-329.*
Menon, "Performance of Disk Arrays in Transaction Processing environment", 1992, IBM, p. 302-309.*
Hou, "Balancing I/O Response time and Disk REbuild Time in a RAID 5 Disk Array", 1993, IEEE, 70-79.*
Fu, "Rebuild strategies for redundant disk arrays", Sep. 2004 (from document properties), NJIT, pp. 1-4.*

* cited by examiner

*Primary Examiner* — Robert Beausoliel, Jr.
*Assistant Examiner* — Jeison C Arcos (57) ABSTRACT

Embodiments include methods, apparatus, and systems for controlling of sparing in a storage system. In one embodiment, a method compares a first amount of time to complete sparing of data from a failed disk in a storage system with a second amount of time to complete a user request to the storage system in order to determine when to create a copy of the data from the failed disk.

20 Claims, 5 Drawing Sheets

CONTROL OF SPARING IN STORAGE SYSTEMS

BACKGROUND

Enterprises commonly maintain multiple copies of important data and expend large amounts of time and money to protect this data against losses due to disasters or catastrophes. In some storage systems, data is stored across numerous disks that are grouped together. These groups can be linked with arrays to form clusters having a large number of individual disks.

When an individual disk fails in a storage system, redundancy is lost with respect to the data stored on the failed disk. Data is vulnerable since only a single copy of the data exists. If the data from the failed disk is not rebuilt or copied, then failure of another disk could result in permanent loss of data.

In order to prevent permanent loss of data after a disk failure, data stored on the failed disk is rebuilt or copied to restore data redundancy. The process of reconstructing data to have data redundancy is known as rebuilding or sparing.

Problems can occur during the process rebuilding or sparing of data. If the process favors user input/output (I/O) requests so such requests preempt internal data recovery, then data sparing can stall in the presences of a sustained workload. During this time, data is vulnerable to being permanently lost if another disk failure occurs. On the contrary, if the process favors data recovery over user requests, then latency on the user requests can be high and cause unacceptable delays in processing requests.

DETAILED DESCRIPTION

Embodiments are directed to apparatus, systems, and methods to manage and control sparing in storage systems. After one or more disks in a disk array fail, exemplary embodiments commence a process to reconstruct data to obtain data redundancy in the disk array. Exemplary embodiments use a fuzzy controller to enhance the ability of the storage system to achieve fast responses to I/O requests while rebuilding data redundancy. A balance is provided between the response time for user requests and the time to achieve data redundancy after the failure. The terms spare, rebuild and reconstruct are used interchangeably and refer to the regeneration of the redundancy in the disk array.

One exemplary embodiment uses fuzzy logic to control queues in the storage system. A fuzzy controller is used to measure (capture) the variability of multiple input parameters and then determine an optimal control of the queuing system. Fuzzy-logic attains data for several parameters to control both servicing of I/O requests and sparing. By way of example, these parameters include, but are not limited to, one or more of response time to user requests, fraction of data spared, time spent on sparing, throughput (example, number of I/Os arriving per second to the disk array), response time for disk arrays to perform a read/write operation (example, a measurement of how long to receive, process, and return a user request). The number of input parameters N, is not restricted to a fixed number. Different embodiments of the invention use of different number of input parameters.

Figure 1:
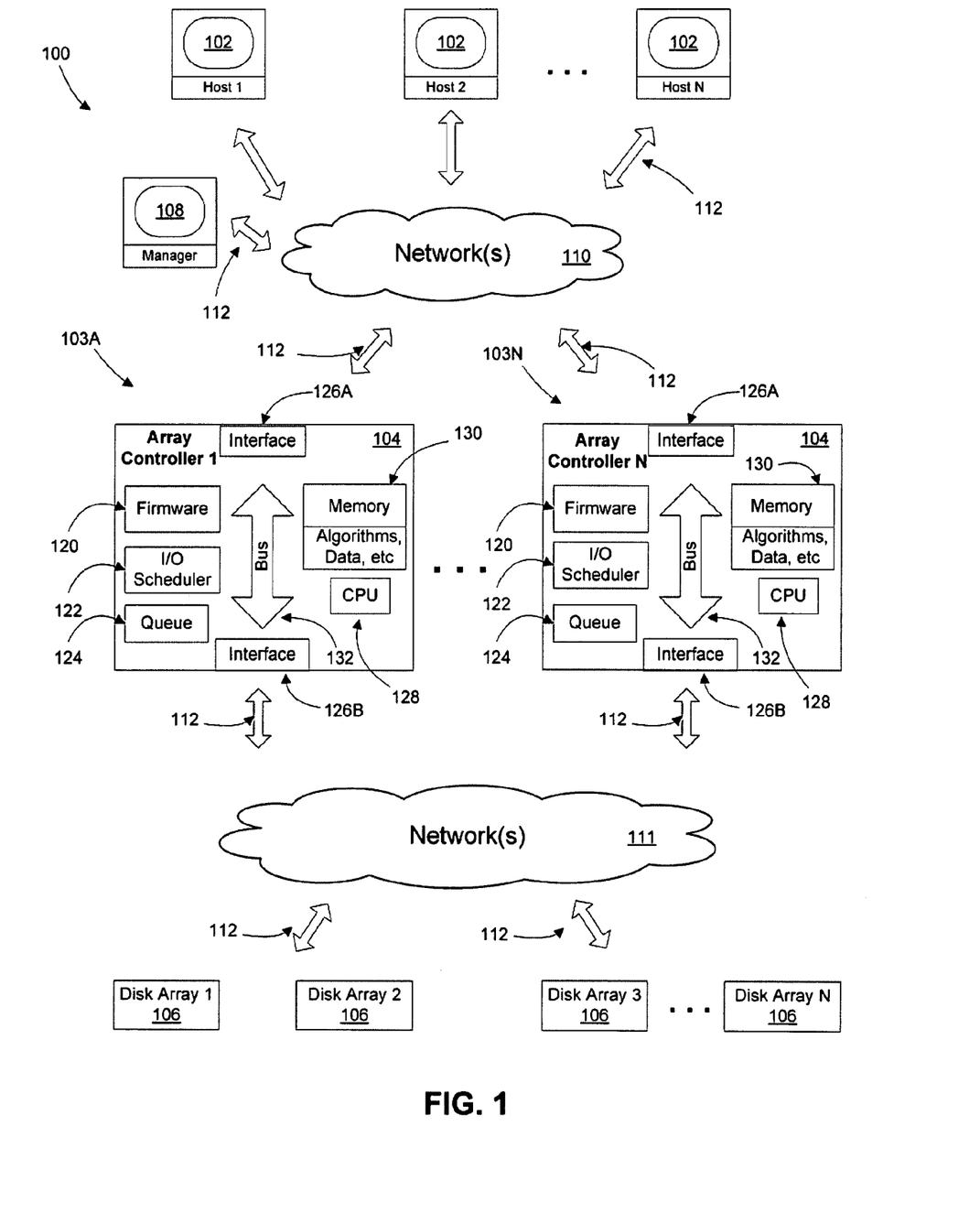
FIG. 1 is a block diagram of a storage system in accordance with an exemplary embodiment.

FIG. 1 is a block diagram of an exemplary distributed file or storage system 100 in accordance with an exemplary embodiment. By way of example, the system is a cluster storage network and/or a storage area network (SAN) that includes a plurality of host computers 102 and one or more storage devices or arrays 103A, 103N that include one or more storage controllers 104 (shown by way of example as an array controller), a plurality of storage devices 106 (shown by way of example as disk array 1 to disk array N), and a manager 108 in communication with the storage controllers and devices.

The host computers 102 (shown as host 1 to host N) and manager 108 are coupled to the array controllers 104 through one or more fabrics or networks 110, and the storage devices or arrays 103 are coupled to the storage devices 106 through one or more fabrics or networks 111. For instance, the hosts communicate with an array controller using a Small Computer System Interface (SCSI) or other interface/commands over a fiber channel (FC). By way of example, networks 110 and 111 include one or more of the Ethernet, fibre channel (FC), serial attached SCSI (SAS), iSCSI, internet, local area network (LAN), wide area network (WAN), public and/or private networks, etc. Communications links 112 are shown in the figure to represent communication paths or couplings between the hosts, controllers, and storage devices.

In one exemplary embodiment, the array controller 104 and disk arrays 106 are network attached devices providing random access memory (RAM) and/or disk space (for storage and as virtual RAM) and/or some other form of storage such as magnetic memory (example, tapes), micromechanical systems (MEMS), or optical disks, to name a few examples. Typically, the array controller and disk arrays include larger amounts of RAM and/or disk space and one or more specialized devices, such as network disk drives or disk drive arrays, (example, redundant array of independent disks (RAID)), high speed tape, magnetic random access memory (MRAM) systems or other devices, and combinations thereof. In one exemplary embodiment, the array controller 104 and disk arrays 106 are memory nodes that include one or more servers.

The storage controller 104 manages various data storage and retrieval operations. Storage controller 104 receives I/O requests or commands from the host computers 102, such as data read requests, data write requests, maintenance requests, etc. Storage controller 104 handles the storage and retrieval of data on the multiple disk arrays 106 and disk groups. In one exemplary embodiment, storage controller 104 is a separate device or may be part of a computer system, such as a server. Additionally, the storage controller 104 may be located with, proximate, or a great geographical distance from the disk arrays 106 or from each other.

The array controller 104 includes numerous electronic devices, circuit boards, electronic components, etc. By way of example, the array controller 104 includes firmware 120, an input/output (I/O) scheduler 122, a queue 124, one or more interfaces 126, one or more processors 128 (shown by way of example as a CPU, central processing unit), and memory 130 (including read and write cache). CPU 128 performs operations and tasks necessary to manage the various data storage and data retrieval requests received from host computers 102. For instance, processor 128 is coupled to a host interface 126A that provides bidirectional data communications to one or more host computers 102. Processor 128 is also coupled to an array interface 126B that provides bidirectional data communications to the disk arrays 106.

Memory 130 is also coupled to processor 128 and stores various information used by processor when carrying out its tasks. By way of example, memory 130 includes one or more of volatile memory, non-volatile memory, or a combination of volatile and non-volatile memory. The memory 130, for example, stores applications, data, control programs, algorithms (including software to implement or assist in implementing embodiments in accordance with the present invention), and other data associated with the storage device (example, state data such as mapping metadata, configuration metadata, and cached user data). The processor 128 communicates with memory 130, interfaces 126, and the other components via one or more buses 132.

In at least one embodiment, the storage devices are fault tolerant by using existing replication, disk logging, and disk imaging systems and other methods including, but not limited to, one or more levels of redundant array of inexpensive disks (RAID). Replication provides high availability when one or more of the disk arrays crash or otherwise fail. Further, in one exemplary embodiment, the storage devices provide memory in the form of a disk or array of disks where data items to be addressed are accessed as individual blocks stored in disks (example, 512, 1024, 4096, etc. . . . bytes each) or stripe fragments (4K, 16K, 32K, etc. . . . each).

In one exemplary embodiment, the I/O scheduler manages and schedules processor time for performing I/O requests. The scheduler balances loads and prevents any one process from monopolizing resources while other processes starve for such resources. The scheduler further performs such functions as deciding which jobs (example, I/O requests) are to be admitted to a ready queue, deciding a number or amount of processes to concurrently execute, determining how performance (example, bandwidth or I/Os per second) is divided among plural initiators (example, applications) so each initiator receives optimal performance.

In one embodiment the storage devices 103A, 103N are disk arrays. Each disk array can have one or more controllers. For instance, an array has two controllers for redundancy.

In one embodiment, storage devices 103A, 103N are physically located in a same data center. In another embodiment, the storage devices are located a great geographical distance apart in separate data centers. Further, although only two storage devices are shown, a SAN can include hundreds or thousands of such storage devices.

One exemplary embodiment includes an extension of queuing systems with vacations to model the sparing process based on a neuro-fuzzy controller. The controller measures input parameters and controls the queue. In order to discuss an exemplary embodiment, two approaches to control the sparing process are compared. The first approach includes an empty/no-empty QSV (queue system with vacations) model, where the sparing process only takes place when the queue is empty (i.e., when there are no users requests). The second approach includes a neuro-fuzzy controller that uses one or more parameters to make the decision whether to allow user requests to be carried out or proceed with the sparing. For illustration, three parameters are selected for discussion and include response time to user requests, fraction of data spared, time spent on sparing.

By way of example, a RAID1 (Redundant Array of Independent/Inexpensive Disks) disk array is used for discussion. The disk array can be in one of three modes: 1) optimal, when all the disks are working; 2) degraded, when one disk fails; 3) failed, when one pair of disks with the same data fail so there is no way to recover the data.

Figure 2A:
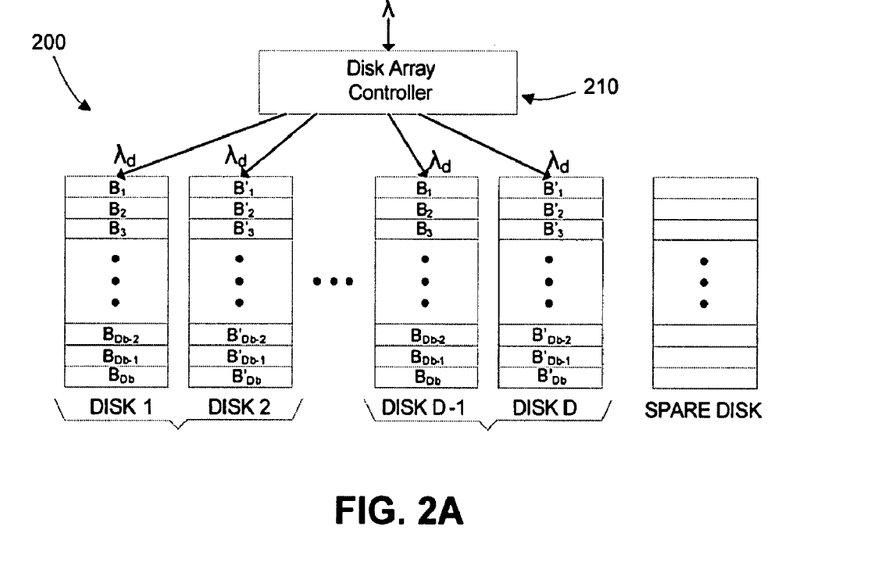
FIG. 2A shows an exemplary RAID disk array data layout in accordance with an exemplary embodiment.

FIG. 2A shows an exemplary RAID level 1 disk array data layout 200. The layout 200 includes a disk array controller 210 coupled to a plurality of disk arrays consisting of D disks, where D is an even number. The mirroring of the disks is by pairs of the $d_{th}$ with $d_{th}+1$ disk, where $d=1, 3, 5, \ldots, D-1$. The capacity of the disk is referred to as $C_d$. The disks are divided up in $N_b$ number of disk blocks of size $S_b$. The number of $N_b$ blocks per disk depends on the capacity of the disk $C_d$. The number of blocks per disk is shown in the following equation:

$$N_b = C_d/S_b.$$

In one exemplary embodiment, the disk block is the atomic unit of storage for the disk array. When newly arrived data has to be stored on a disk, a new disk block is allocated. For illustration, a block size $S_b=128$ KB is used. Each disk block is referred to as $B_i$, where $i=1, 2, 3, \ldots, N_b$.

FIG. 2A shows the data layout of the disk array in optimal mode. Each block $B_i$ has a corresponding mirror on the other disk indicated by $B'_i$. For example, disk 1 (disk $d_{th}$) and disk 2 (disk $d_{th}+1$) form a pair of data and its mirror. The spare disk is in standby mode and no data blocks have been allocated on it.

A workload with arrival rate $\lambda$ is applied to the disk array controller 210 by the users. Instead of specifying an arrival rate $\lambda$ to the disk controller, the throughput $\chi$ in IOs per second (IO/s), can be specified by the following equation:

$$\chi = \frac{1}{\lambda}.$$

For discussion, it is assumed that the throughput is distributed across the disks and a balanced workload exists across the disks.

Figure 2B:
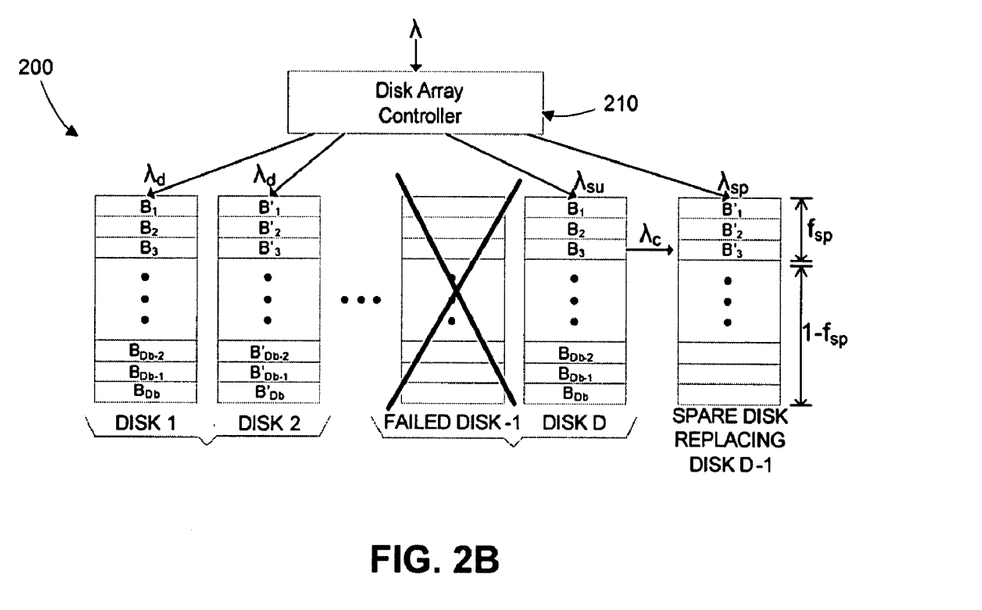
FIG. 2B shows the disk array data layout of FIG. 2A with a failed disk in accordance with an exemplary embodiment.

When a disk fails, the sparing process is started and the copy of the data on the surviving disk to the spare disk is performed on a block by block basis. FIG. 2B shows an example of a failed disk (disk shown with an "X" and labeled Failed Disk-1). In this case, disk D−1 failed and the spare disk now in process of replacing disk D−1. The sparing process copies the disk blocks $B_i$ from disk D to the spare disk that is now the newly disk D−1.

The fraction of the $N_b$ blocks copied is $f_{sp}$. Let $B_c$ be the number of disk blocks already copied to the spare disk, then the following equation exists:

$$f_{sp} = B_c/N_b.$$

When the disk array is sparing, the combined thloughput of the disks changes from that of the optimal state since two different conditions exist. In a first condition, the surviving disk serves its share of user requests and reads its disk blocks at a rate. In a second condition, the spare disk writes its disk blocks and serves read requests for the data already copied. The remaining D−2 disks are serving requests as they would normally do.

Figure 3:
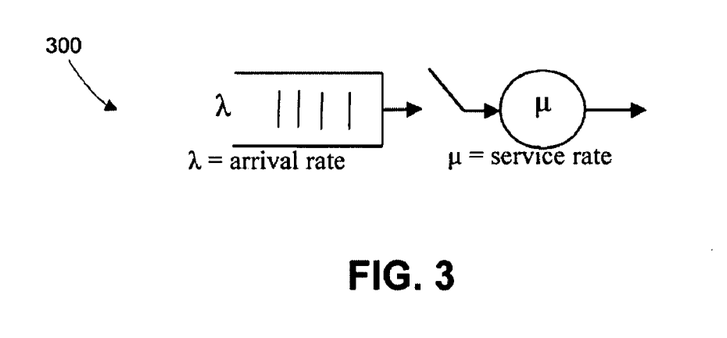
FIG. 3 illustrates a queuing system with vacations in accordance with an exemplary embodiment.

FIG. 3 illustrates an exemplary queuing system 300 with vacations (QSV). A queuing system in which the server can be turned off or removed is said to be a queuing system with vacations.

The requests to the queuing system arrive at a rate λ, and the server processes the requests at a μ rate. When the server is idle (queue is empty), it turns itself off and goes on vacation to execute some process in the background. After some time the server comes back and rechecks the queue. If not empty, then the server turns itself on. Otherwise, it keeps itself off and proceeds to another vacation. As used herein, this process is referred to as the empty/no-empty approach to control the queuing system.

Figure 4:
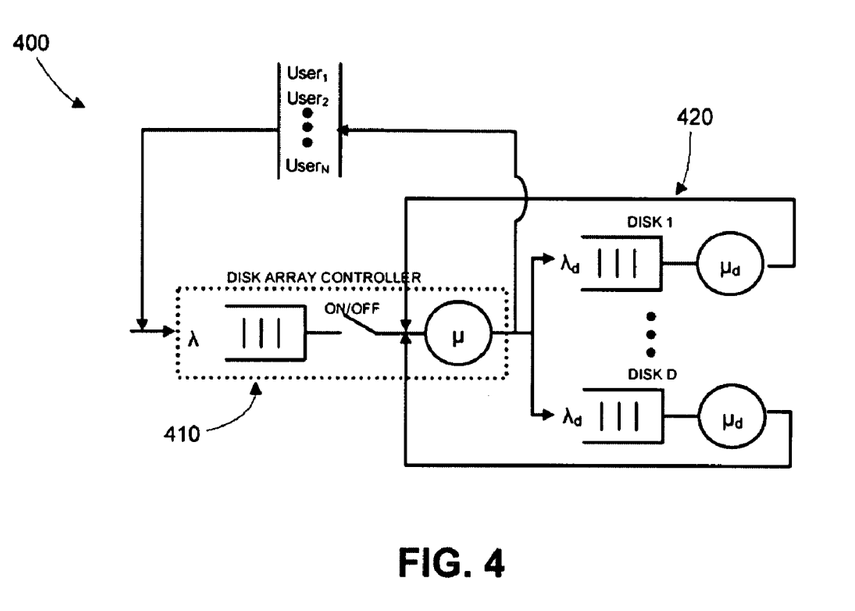
FIG. 4 shows an exemplary queuing system in accordance with an exemplary embodiment.

FIG. 4 shows an exemplary queuing system 400 including a disk array controller 410 and a plurality of disks 420. Here, the disk array is based on the central server model with the addition of the QSV. The user requests to the queuing system arrive at a rate λ, and the disk array controller the processes requests at a μ service rate.

In one embodiment, the use of fuzzy logic provides the ability to efficiently model and control systems where traditional mathematical models can be difficult to derive. The problem of finding optimal policies for networks of queues is not trivial. A simulation of the queuing system in FIG. 4 is used to show the improvements made by the neuro-fuzzy controller.

In one exemplary embodiment, the service time, $T_d$, of a disk request depends on three factors: 1) rotational latency, $t_{rot}$; 2) seek time $t_{seek}$; and 3) and transfer time, $t_{xfer}$ as shown in the following equation:

$$T_d = t_{rot} + t_{seek} + t_{xfer}.$$

The disk position time, dpt, is defined as follows:

$$dpt = t_{rot} + t_{seek}.$$

The disks are modeled using the following equation:

$$T_d = dpt + t_{xfer}.$$

The disk service times are difficult to estimate since some factors, like disk specifications, disk caching and scheduling policy are hard to determine. For random workloads, the disk position time is modeled by the following equation:

$$dpt = a + \frac{b}{\sqrt{1 + disk\_queue}}.$$

In one exemplary embodiment, the values found for random reads were a=2 and b=5.8. The values for random writes were a=2.5 and b=6.85.

One exemplary embodiment uses a neuro-fizzy solution to balance the time needed to complete the sparing and the latency of the user requests. One embodiment uses two neural nets with the following exemplary features. First, the input parameters to the neural net controller are normalized so they are in the [0,1] range. Second, the input parameters are fuzzified using three membership functions, LOW, MED and HIG. Third, the fuzzification of the input parameters is made by the first neural net. Fourth, the second neural net implements the rule base and makes the decision whether to keep sparing or hold the sparing temporarily, based on the fuzzified parameters from the first neural net. The decision can be made in a periodic basis, for example, having a timer that will expire every $T_p$ seconds (or fractions of a second). At the end of each period of $T_p$ seconds, the input parameters are gathered and the embodiment of the solution executes the process described above and makes the decision whether to keep sparing or hold the sparing temporarily.

Another embodiment is possible, in which the plural parameters are normalized and input into fuzzifier that outputs the fuzzy values. And a second section where a fuzzy controller makes the decision whether to continue sparing or discontinue sparing. The fuzzy controller uses a rule base table to determine when to continue or discontinue sparing.

Figure 5:
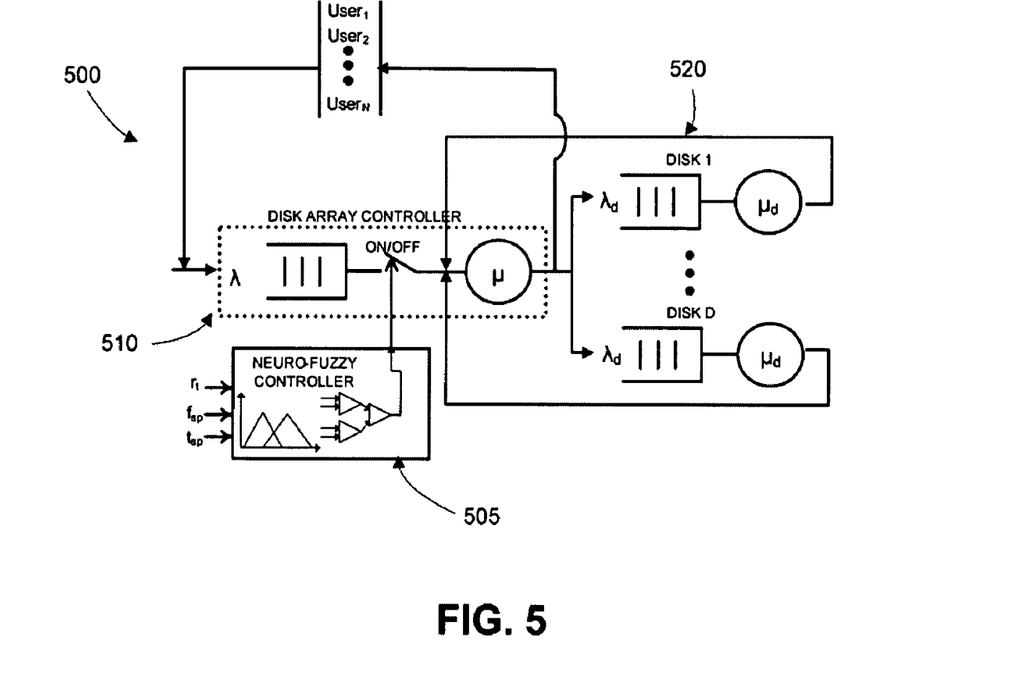
FIG. 5 shows a graphical model using a neuro-fuzzy controller for sparing in accordance with an exemplary embodiment.

FIG. 5 shows a graphical model 500 of a proposed solution. The model includes a neuro-fuzzy controller 505 coupled to a disk array controller 510 and a plurality of disks 520. In one exemplary embodiment, the input parameters of the fuzzy controller include, but are not limited to, three different parameters: 1) the fraction of sparing, $f_{sp}$; 2) the response time of the disk array controller $r_t$; and 3) the time elapsed since a disk failed and the sparing process started, $t_{sp}$.

For this exemplary embodiment of the neuro-fuzzy controller, the three parameters are normalized. The first parameter $f_{sp}$ is in the range [0,1]. The other two parameters are normalized by making two assumptions. The first assumption entails the existence of upper limits to the response time that the user applications would consider excessive. These are related to latencies that are considered to be the maximum acceptable. The response time $r_t$ is then normalized with regards to that upper response time limit. By way of example, it is assumed that a delay of $rt_{max}$=50 ms is the maximum that can be tolerated. The normalized response time, $rt_n$, used by the fuzzy controller is then as follows:

$$rt_n = \frac{r_t}{rt_{max}}.$$

The second assumption is that there is a maximum time acceptable for the user without the redundancy of the data restored. This assumption is reasonable since one purpose of a disk array is to guarantee the redundancy of the data so there is no data loss when a disk fails. The time elapsed in the sparing process since a disk failed, $t_{sp}$, is normalized also. The maximum time allowed for a sparing to finish is assumed to be $tsp_{max}$=12 hours. With this assumption the normalized time elapsed in the sparing process, $tsp_n$ is as follows:

$$tsp_n = \frac{t_{sp}}{tsp_{max}}.$$

Figure 6:
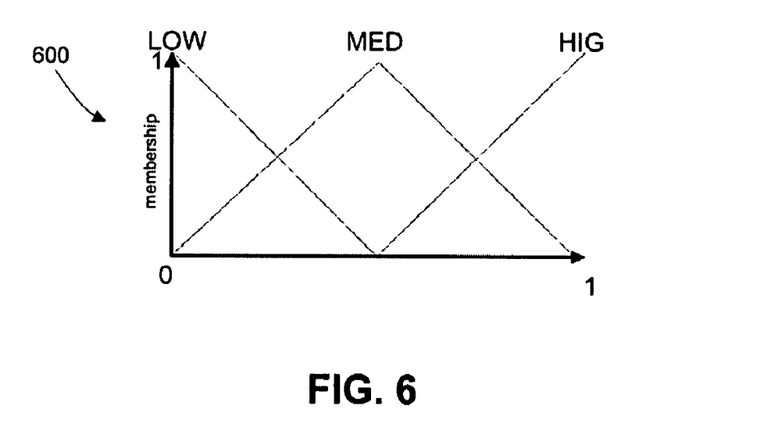
FIG. 6 shows a graph of membership functions for description of three input parameters in accordance with an exemplary embodiment.

With the three input parameters normalized, now the membership function can be defined. Three linguistic values are assigned, LOW, MED, and HIG, which stand for "low", "medium" and "high" value. FIG. 6 shows a graph 600 of the membership functions for all three input parameters. The translation of the value of a normalized input parameter in the range [0,1] to one of the three linguistic values (LOW, MED, and HIGH) is referred to as the fuzzification of the normalized input parameter. The linguistic values assigned to the parameter after the fuzzification is referred to as the fuzzy value. As an example, if $tsp_n$=0.5 then, after the fuzzification, the fuzzy value of $tps_n$=MED.

Figure 7:
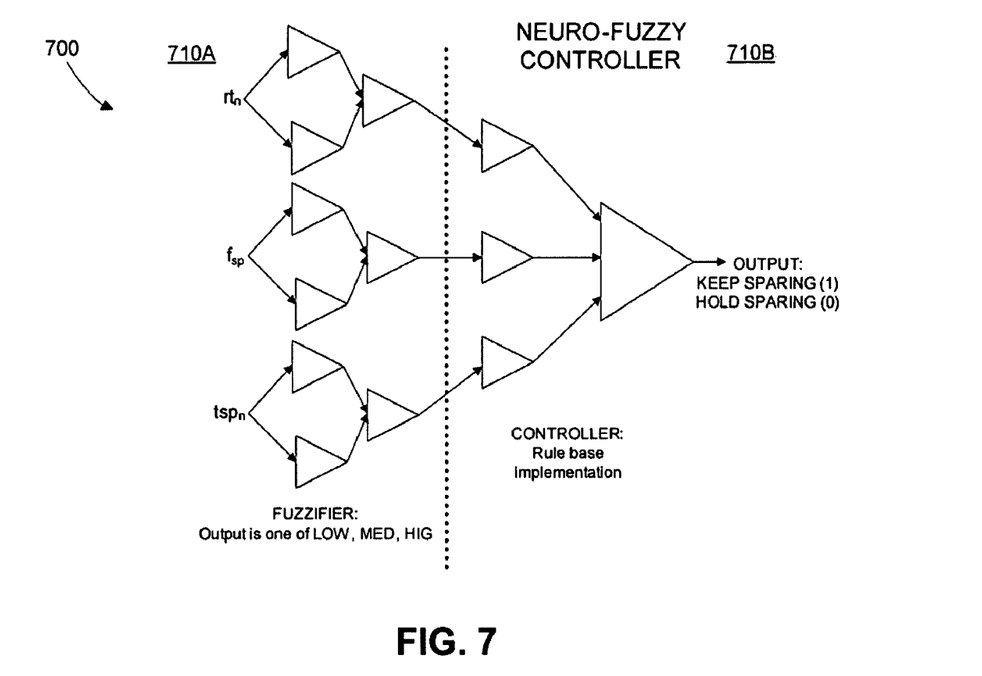
FIG. 7 shows a model of a structure of a neural net in accordance with an exemplary embodiment.

The three normalized parameters ($f_{sp}$, $rt_n$, $tsp_n$) in the range [0,1] are the input to the fuzzifier neural net. FIG. 7 shows a model 700 of a structure of the neural net used. The model includes two sections 710A and 710B. The first neural net section 710A, based on the value of the normalized parameter, will output a number 0, 0.5 or 1 that will correspond to one of the three possible fuzzy values (LOW, MED, HIG).

The second section 710B implements the controller part, which is based on the rule base.

Now the next step is the specification of the rules for the rule base. The linguistic criteria are summarized as follows. First, the response time of the disk array controller, $r_t$, should be kept as low as possible. This feature is balanced during the sparing process. If the response time $r_t$, is low, then proceed with the sparing. Second, the sparing process should be finished as soon as possible. This feature is also balanced. Here, more priority is given to the sparing process as time becomes closer to the maximum time allowed for a sparing process to finish, $tsp_{max}$. Third, the fraction of sparing data spared, $f_{sp}$, should be as close to one as possible. If the fraction of data already spared is close to zero, then favor the sparing process over the response time.

With these linguistic criteria, the rule base is built. The output of each rule is the number of blocks $B_i$ (mentioned above) to be spared in one iteration of the embodiment of the solution. Remember, every iteration can occur every $T_p$ seconds. Let $B_{sp}$ represent the number of blocks to spare, then the output of each rule is $B_{sp}$. The $B_{sp}$ is therefore, a function of the fuzzified input parameters:

$$B_{sp}=f(p_1, p_2, \ldots, p_N).$$

Here, $p_1, p_2, \ldots, p_N$ are the N input parameters mentioned above. As an example of one possible embodiment, $B_{sp}$ can be a function of the fuzzy value of the parameters $rt_n$, $f_{sp}$, and $tsp_n$.

$$B_{sp} = f(rt_n, f_{sp}, tsp_n) = \begin{cases} \text{if } rt_n = \text{LOW}, f_{sp} = \text{LOW}, tsp_n = \text{LOW} & \text{then } B_{sp} = 4 \\ \vdots \\ \text{if } rt_n = \text{MED}, f_{sp} = \text{MED}, tsp_n = \text{MED} & \text{then } B_{sp} = 2 \\ \vdots \\ \text{if } rt_n = \text{HIG}, f_{sp} = \text{HIG}, tsp_n = \text{HIG} & \text{then } B_{sp} = 4 \end{cases}$$

The complete specification of the $B_{sp}$ function is in Table 1 show below. This is also the complete rule base for the neuro-fuzzy controller.

TABLE 1

| Rule base | | | | | | | | | | | |
|---|---|---|---|---|---|---|---|---|---|---|---|
| Rules 1-9 | | | | Rules 10-18 | | | | Rules 19-27 | | | |
| $rt_n$ | $f_{sp}$ | $tsp_n$ | out | $rt_n$ | $f_{sp}$ | $tsp_n$ | out | $rt_n$ | $f_{sp}$ | $tsp_n$ | out |
| LOW | LOW | LOW | YES | MED | LOW | LOW | YES | HIG | LOW | LOW | NO |
| LOW | LOW | MED | YES | MED | LOW | MED | YES | HIG | LOW | MED | NO |
| LOW | LOW | HIG | YES | MED | LOW | HIG | YES | HIG | LOW | HIG | YES |
| LOW | MED | LOW | YES | MED | MED | LOW | YES | HIG | MED | LOW | NO |
| LOW | MED | MED | YES | MED | MED | MED | YES | HIG | MED | MED | NO |
| LOW | MED | HIG | YES | MED | MED | HIG | YES | HIG | MED | HIG | YES |
| LOW | HIG | LOW | YES | MED | HIG | LOW | NO | HIG | HIG | LOW | NO |
| LOW | HIG | MED | YES | MED | HIG | MED | YES | HIG | HIG | MED | NO |
| LOW | HIG | HIG | YES | MED | HIG | HIG | YES | HIG | HIG | HIG | YES |

The $B_{sp}$ function can also be specified using an algebraic formula. It is possible to assign numerical values to the LOW, MED and HIG fuzzy values. For example, LOW=0, MED=1 and HIG=2. With this it would be possible to specify another $B_{sp}$ function like:

$$B_{sp}=f(rt_n, f_{sp}, tsp_n)=rt_n+f_{sp}tsp_n.$$

As noted, this is only an example of how this function can be specified. It is not limited to a table of values.

The output of the fuzzy controller is the decision to turn on/off the disk array controller to serve user requests (on) or regenerate the redundancy (off). If the number of blocks to spare $B_{sp}$=0, then the decision is to turn the array on to serve user requests. If $B_{sp}$>0, then the decision is to turn on the disk array off to regenerate redundancy.

Exemplary embodiments are not limited to any particular RAID level. For instance, FIGS. 2A and 2B can also represent a RAID 5 disk array. In this example, exemplary embodiments can be used to discover an optimal policy that balances the time needed to complete the sparing and the latency of the user requests by using a fuzzy controller.

The input parameters are fuzzified and include (1) the queue length of the controller ql; (2) the response time of the disk array controller $r_t$; and (3) the time elapsed since a disk failed and the sparing process started $t_{sp}$. For this embodiment, the three parameters are normalized. The first parameter, queue length ql, provides an improvement over the traditional QSV, empty/no-empty approach. This is because the embodiment allows the sparing process to execute even if there are requests in the queue waiting to be served. The queue length ql is normalized. For example, an assumption is made that for an average response time for the users of $RT_{avg}$=10 ms and an average throughput of $\lambda_{avg}$=1,000 IO/s. Then, an estimation of the average queue occurs as follows:

$$L=RT_{avg}*\lambda_{avg}=0.010*1000=10$$

In this example, the queue length ql is considered to be 10 as the average. Further, an assumption is made that the $ql_{max}$ is 20 and the normalization of the ql is obtained by using the following equation:

$$ql_n = \frac{ql}{ql_{max}}.$$

As discussed in connection with the RAID 1 example, the other two parameters are normalized by making various assumptions (example, the response time, $r_t$, is normalized and the time elapsed in the sparing process since a disk failed, $t_{sp}$, is normalized).

Figure 8:
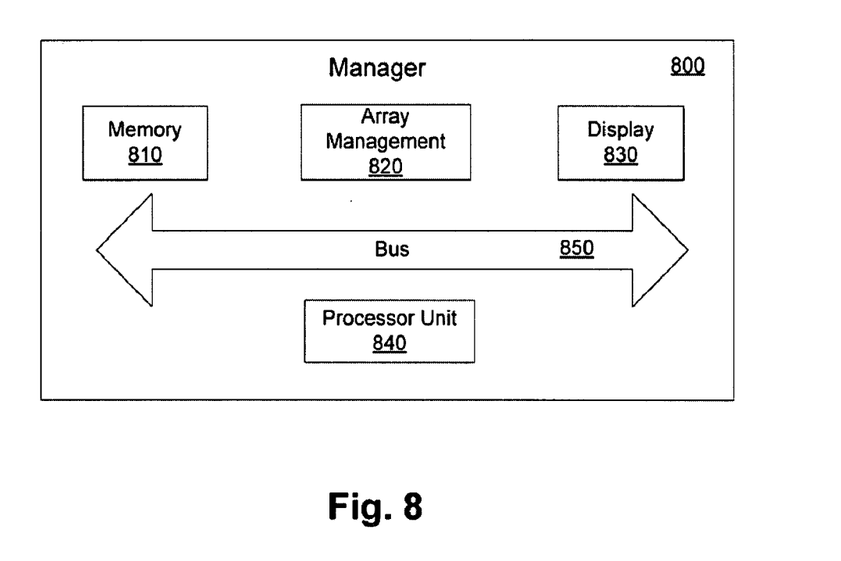
FIG. 8 is a block diagram of a manager in accordance with an exemplary embodiment.

FIG. 8 is a block diagram of a manager 800 in accordance with an exemplary embodiment of the present invention. In one embodiment, the manager is a computer that includes memory 810, array management software or algorithms 820, display 830, processing unit 840 and one or more buses 850.

In one embodiment, the processor unit includes a processor (such as a central processing unit, CPU, microprocessor, application-specific integrated circuit (ASIC), etc.) for controlling the overall operation of memory 810 (such as random access memory (RAM) for temporary data storage, read only memory (ROM) for permanent data storage, and firmware). The memory 810, for example, stores applications, data, programs, algorithms (including software to implement or assist in implementing embodiments in accordance with the present invention) and other data. The processing unit 840 communicates with memory 810 and display 830 via one or more buses 850.

As used herein, the term "storage device" means any data storage device capable of storing data including, but not limited to, one or more of a disk array, a disk drive, a tape drive, optical drive, a SCSI device, or a fiber channel device. As used herein, a "disk array" or "array" is a storage system that includes plural disk drive, a cache, and controller. Arrays include, but are not limited to, networked attached storage (NAS) arrays, modular SAN arrays, monolithic SAN arrays, utility SAN arrays, and storage virtualization.

In one exemplary embodiment, one or more blocks or steps discussed herein are automated. In other words, apparatus, systems, and methods occur automatically. As used herein, the terms "automated" or "automatically" (and like variations thereof) mean controlled operation of an apparatus, system, and/or process using computers and/or mechanical/electrical devices without the necessity of human intervention, observation, effort and/or decision.

The methods in accordance with exemplary embodiments of the present invention are provided as examples and should not be construed to limit other embodiments within the scope of the invention. For instance, blocks in diagrams or numbers (such as (1), (2), etc.) should not be construed as steps that must proceed in a particular order. Additional blocks/steps may be added, some blocks/steps removed, or the order of the blocks/steps altered and still be within the scope of the invention. Further, methods or steps discussed within different figures can be added to or exchanged with methods of steps in other figures. Further yet, specific numerical data values (such as specific quantities, numbers, categories, etc.) or other specific information should be interpreted as illustrative for discussing exemplary embodiments. Such specific information is not provided to limit the invention.

In the various embodiments in accordance with the present invention, embodiments are implemented as a method, system, and/or apparatus. As one example, exemplary embodiments and steps associated therewith are implemented as one or more computer software programs to implement the methods described herein. The software is implemented as one or more modules (also referred to as code subroutines, or "objects" in object-oriented programming). The location of the software will differ for the various alternative embodiments. The software programming code, for example, is accessed by a processor or processors of the computer or server from long-term storage media of some type, such as a CD-ROM drive or hard drive. The software programming code is embodied or stored on any of a variety of known media for use with a data processing system or in any memory device such as semiconductor, magnetic and optical devices, including a disk, hard drive, CD-ROM, ROM, etc. The code is distributed on such media, or is distributed to users from the memory or storage of one computer system over a network of some type to other computer systems for use by users of such other systems. Alternatively, the programming code is embodied in the memory and accessed by the processor using the bus. The techniques and methods for embodying software programming code in memory, on physical media, and/or distributing software code via networks are well known and will not be further discussed herein.

The above discussion is meant to be illustrative of the principles and various embodiments of the present invention. Numerous variations and modifications will become apparent to those skilled in the art once the above disclosure is fully appreciated. It is intended that the following claims be interpreted to embrace all such variations and modifications.

What is claimed is:

1. A method, comprising:
sparing data to reconstruct a copy of the data after a disk failure in a storage system;
inputting, to a controller and while continuing to spare the data, a first parameter that includes a response time to perform an input/output (I/O) request from an application to a disk in a disk array of the storage system;
inputting, to the controller and while continuing to spare the data, a second parameter that includes an amount of data spared to the disk; and
controlling, while continuing to spare the data and using the first and second parameters, both executing I/O requests from the application to the disk and a rate of sparing the data to the disk to reconstruct the copy of the data after the disk failure in the storage system, wherein the sparing to the disk continues when the application has I/O requests pending to the disk, and the controller uses the first and second parameters to determine when to continue to spare the data and when to discontinue to spare the data.

2. The method of claim 1 further comprising:
inputting, to the controller, a third parameter that includes an amount of time spent on sparing data to the disk;
controlling, using the first, second, and third parameters, both executing I/O requests from the application to the disk and the rate of sparing to the disk.

3. The method of claim 1 further comprising:
inputting, to the controller, a third parameter that includes a number of I/Os that arrive at the disk array during a given time period;
controlling, using the first, second, and third parameters, both executing I/O requests from the application to the disk and sparing to the disk.

4. The method of claim 1, further comprising:
inputting, to the controller, a third parameter that includes a response time for the disk array to perform reads and writes from user requests;
controlling, using the first, second, and third parameters, both executing I/O requests from the application to the disk and sparing to the disk.

5. The method of claim 1 further comprising, deciding, based on the first and second parameters, whether to execute an I/O request pending in a queue from the application or continue with the sparing.

6. The method of claim 1 further comprising, determining the rate at which to spare the data to the disk based on balancing a time needed to complete the sparing and a latency of user requests for I/O operations.

7. A method, comprising:
sparing data to reconstruct a copy of the data after a disk failure in a storage system;
inputting, to a controller and while continuing to spare the data, a first parameter that includes a response time to perform an input/output (I/O) request from an application to a disk in a disk array of the storage system;

inputting, to the controller and while continuing to spare the data, a second parameter that includes an amount of data spared to the disk;

fuzzifying the first parameter and second parameter; and controlling, while continuing to spare the data and using the first and second parameters, both executing I/O requests from the application to the disk and a rate of sparing the data to the disk to reconstruct the copy of the data after the disk failure in the storage system, wherein the sparing to the disk continues when the application has I/O requests pending to the disk, and the controller uses the first and second parameters to determine when to continue to spare the data and when to temporarily discontinue to spare the data.

8. A computer readable medium storing instructions for causing a computer to execute a method, comprising:

commencing a sparing operation to spare data to a disk after a disk failure in a storage system;

measuring input parameters that include a response time to perform an input/output (I/O) request from an application to the storage system and an amount of data spared to the disk;

fuzzifying the input parameters to determine when to continue the sparing operation to spare the data the disk and when to temporarily discontinue the sparing operation to spare the data to the disk; and continuing the sparing operation to spare the data to the disk while user requests are pending to the disk.

9. The computer readable medium of claim 8, wherein the input parameters are fuzzified to values of low, medium, and high.

10. The computer readable medium of claim 8 further comprising, utilizing three parameters to select one of continuing the sparing operation of sparing the data to the disk and stopping the sparing operation of sparing the data to the disk, wherein the three parameters include the response time to perform the I/O request, the amount of data spared, and an amount of time spent on sparing data to the disk.

11. The computer readable medium of claim 8 further comprising:

normalizing a first parameter that includes a response time to perform a user request;

determining, based on the first parameter, whether to continue the sparing operation to the disk or temporarily hold the sparing operation.

12. The computer readable medium of claim 8 further comprising:

determining a maximum latency for responding to a user request to the storage system;

determining, based on the maximum latency, whether to continue the sparing operation or temporarily hold the sparing operation.

13. The computer readable medium of claim 8 further comprising:

determining a time elapsed since the disk failure;

calculating, based on the time elapsed, when in time to commence sparing the data to the disk.

14. The computer readable medium of claim 8 further comprising:

temporarily holding the sparing operation;

determining an amount of data spared to the disk during the sparing operation;

calculating, based on the amount of data spared to the disk, when in time to resume the sparing operation of sparing to the disk.

15. A storage system, comprising:

a memory for storing an algorithm;

a processor for executing the algorithm to:

spare data to a disk after a disk failure in a disk array of a storage system; and analyze plural parameters to determine when to temporarily stop reconstructing the data to the disk in order to execute an input/output (I/O) request from an application to the disk array, wherein the plural parameters include a response time to perform the I/O request and an amount of data spared, and wherein sparing to the disk continues while I/O requests from a host are pending to the disk in a queue in the storage system.

16. The storage system of claim 15, wherein the processor further executes the algorithm to determine, based on the plural parameters, between executing a pending I/O request to the disk from the host and continuing the sparing to the disk while the I/O request remains in the queue.

17. The storage system of claim 15, wherein the processor further executes the algorithm to determine a rate at which to reconstruct the data to the disk, the rate based on a balance between a time needed to complete reconstructing the data to the disk and a latency of user requests for I/O operations.

18. The storage system of claim 15, wherein the plural parameters are normalized and input into a fuzzy neural net that includes a first section for outputting first fuzzy values and a second section that receives the fuzzy values to determine whether to continue sparing or discontinue sparing.

19. The storage system of claim 15, wherein the processor further executes the algorithm to determine a fraction of data already spared in order to determine when to favor sparing over latency to perform user requests.

20. A storage system, comprising:

a memory for storing an algorithm;

a processor for executing the algorithm to:

reconstruct data to a disk after a disk failure in a disk array of a storage system; and fuzzify plural parameters to determine when to continue to reconstruct the data to the disk and when to temporarily stop reconstructing the data to the disk in order to execute an input/output (I/O) request from an application to the disk array, wherein the plural parameters include a response time to perform the I/O request and an amount of data reconstructed, and wherein reconstructing the data to the disk continues while I/O requests from a host are pending to the disk in a queue in the storage system.

* * * * *

UNITED STATES PATENT AND TRADEMARK OFFICE
CERTIFICATE OF CORRECTION

PATENT NO. : 8,201,018 B2
APPLICATION NO. : 11/857335
DATED : June 12, 2012
INVENTOR(S) : Guillermo Navarro et al.

It is certified that error appears in the above-identified patent and that said Letters Patent is hereby corrected as shown below:

In column 11, line 24, in Claim 8, after "spare the data" insert -- to --.

Signed and Sealed this
Eighteenth Day of December, 2012

David J. Kappos
*Director of the United States Patent and Trademark Office*